(12) United States Patent
Fitzgerald et al.

(10) Patent No.: US 6,851,658 B2
(45) Date of Patent: Feb. 8, 2005

(54) CONTROL VALVE TRIM AND BORE SEAL

(75) Inventors: William V. Fitzgerald, Melbourne, IA (US); Cecil J. Eggleston, Jr., Marshalltown, IA (US); Wade J. Helfer, Ames, IA (US); Donald Ray Bush, Marshalltown, IA (US)

(73) Assignee: Fisher Controls International Inc., St. Louis, MO (US)

( * ) Notice: Subject to any disclaimer, the term of this patent is extended or adjusted under 35 U.S.C. 154(b) by 39 days.

(21) Appl. No.: 10/358,050

(22) Filed: Feb. 4, 2003

(65) Prior Publication Data

US 2004/0149950 A1 Aug. 5, 2004

(51) Int. Cl.$^7$ ................................................ F16K 1/52
(52) U.S. Cl. ................ 251/282; 137/625.3; 137/625.33
(58) Field of Search ........................ 251/282; 137/625.3, 137/625.33

(56) References Cited

U.S. PATENT DOCUMENTS

| | | | |
|---|---|---|---|
| 3,648,718 A | | 3/1972 | Curran ........................ 137/269 |
| 3,990,475 A | * | 11/1976 | Myers ...................... 137/625.3 |
| 4,397,331 A | | 8/1983 | Medlar ........................ 137/375 |
| 5,018,703 A | | 5/1991 | Goode .......................... 251/127 |
| 5,113,908 A | * | 5/1992 | Steinke .................... 137/625.3 |
| 5,236,014 A | * | 8/1993 | Buls et al. ............... 137/625.3 |

FOREIGN PATENT DOCUMENTS

| | | |
|---|---|---|
| EP | 0 167 252 | 1/1986 |
| EP | 0 573 399 A1 | 12/1993 |
| GB | 1 569 261 | 6/1980 |

OTHER PUBLICATIONS

International Search Report for PCT/US03/39860, issued Apr. 19, 2004.

* cited by examiner

*Primary Examiner*—Edward K. Look
*Assistant Examiner*—John K. Fristoe, Jr.
(74) *Attorney, Agent, or Firm*—Marshall, Gerstein & Borun LLP

(57) ABSTRACT

An ANSI Leakage Class V control valve having consistent shut off characteristics with a reduced actuator force required to open and close the valve is provided. The trim arrangement of the control valve includes a valve cage having a multi-contoured inner surface. The multi-contoured inner surface can include a plurality of surfaces. The multi-contoured surface can include first, second, and third perimeter surfaces, and a first transition surface disposed between and coupling the first and second perimeter surfaces, and a second transition surface disposed between and coupling the second and third perimeter surfaces. The valve also includes a valve plug disposed at one end of a valve stem. The valve plug controls the fluid flow through the valve. The valve plug includes an opening through the plug for equalizing pressure across the valve plug. An annular channel is formed within a wall of the valve plug and is sized to accommodate a sealing ring. The sealing ring engages the second perimeter surface to form a fluid seal that substantially hinders fluid leakage through the valve.

31 Claims, 5 Drawing Sheets

CONTROL VALVE TRIM AND BORE SEAL

FIELD OF THE INVENTION

The present invention relates to control valves, and more particularly to a control valve arrangement suitable for substantially preventing leakage beyond a maximum leakage amount, such as an amount set by ANSI Leakage Class V.

BACKGROUND OF THE INVENTION

The primary purpose of a control valve is to control the flow of a fluid, such as steam, gas, water, and the like. Positioning a moveable operator, for example a valve plug, against a valve seat within the control valve body controls fluid flow. As the valve plug moves proximate to the valve seat, a variable orifice is created that can modulate or control an amount of fluid passing through the valve body. Under certain operational conditions, such as when the valve plug is in contact with the valve seat, leakage of the fluid may still occur. The American National Standards Institute ("ANSI") has established leakage classifications for control valves according to a valve's ability to shut off flow when the valve is closed. ANSI specifies different leakage classes, such as ANSI Leakage Class I, II, III, IV, and V, relating to the amount of flow allowed to pass through the valve when the valve is in a closed position. In general, the leakage requirements become more stringent proceeding from Class I to Class V and therefore more difficult for a valve to meet and maintain these requirements. Specifically, ANSI Leakage Class V states that the maximum leakage allowed through a valve is 0.0005 ml of water per minute, per inch of port diameter, per PSI differential pressure as measured from an inlet port of the valve to an outlet port of the valve. For example, a control valve with 2-inch diameter inlet and outlet ports, with 100 PSI of pressure applied to a fluid passing through the valve, can have up to 0.1 ml of leakage per minute and still satisfy Leakage Class V requirements.

Moreover, conventional control valves with large port sizes are designed to balance the force applied to the valve plug, in an effort to reduce the thrust and therefore the size of the actuator used to operate the valve. The reduction in actuator thrust limits the amount of force produced to seat the valve plug against the valve seat. Consequently, such valves have difficulty meeting the strict Class V requirements, while concurrently providing a balanced valve plug.

FIG. 1 is a cross-sectional illustration of a conventional double port valve that will not meet Class V leakage requirements. Double port valves are often utilized to balance net forces acting on a valve plug and to minimize an actuator force necessary to position the valve plug. The illustrated conventional double port valve 10 has a valve body 10A assembly (valve body) that is generally coupled to an actuator (not shown). The actuator is typically a pneumatically powered device that supplies the force and motion to open or close a valve. The valve body 10A houses a valve plug 11 that is coupled to a valve stem 18. The valve stem 18 is in turn coupled to an actuator stem (not shown) that transmits the actuator thrust to move the valve plug 11. The value plug is positioned within the flow path of the fluid and is movable to selectively modify the rate of flow through the valve. The illustrated value plug has two lands, a first land 12 and a second land 13. The beveled surfaces of the lands 12 and 13 form sealing surfaces when they matingly engage a seat ring 14 at an upper port, and a seat ring 15 at a lower port, respectively.

The surface areas of the first land 12 and the second land 13 are generally of unequal size. When the valve plug 11 is inserted through the top of the valve body 10A during valve assembly, the second land 13 must be sized to pass through the seat ring 14. The first land 12, however, is relatively larger than the second land 13, such that the first land 12 does not pass through the seat ring 14. Rather, the first land 12 seats against the seat ring 14 to form a seal. The difference in size between the first land 12 and the second land 13 results in the surface area of the first land 12 being relatively larger than the second land 13.

In addition to meeting the requirements of a particular ANSI Leakage Class, there is often a desire for the valve plug to be balanced, so that there is a minimal amount of force necessary to open and close the valve with the actuators. Inside a valve, the valve plug moves to block or open a fluid passageway through the valve between the valve inlet and the valve outlet. When the valve plug is shut off (i.e., the valve is closed) there can be a fluid pressure pushing against the valve plug from the inlet side of the valve. The fluid pressure results from the pressurized fluid on the inlet side that is blocked by the valve plug from passing through the valve. The fluid, therefore, pushes on the valve plug.

More specifically, the larger surface area of the first land 12 relative to the second land 13 provides more surface area for fluid to act upon within the valve. This results in the fluid pressure from the inlet 16 exerting a relatively greater force on the first land 12 than on the second land 13 during shut off conditions. The resulting net force is in a direction that opposes the closing of the valve 10 (e.g., upwards in FIG. 1). This net force must be overcome by additional actuator thrust to close the valve 10. Any added force acting against the actuator results in an increased load on the actuator, and can lead to requirement of the larger actuator. Conversely, in the conventional double port design, the surface areas of the first land 12 and the second land 13 are relatively similar in total area. As such, the net force exerted on the valve plug 11 is relatively small.

In addition, it is relatively difficult to machine the lands 12 and 13 and seat rings 14 and 15 to the relatively tight tolerances necessary to prevent leakage at shut off, and to maintain thermal expansion differences at a minimum. Consequently, the example double port valve 10 is difficult to manufacture in a manner such that it would meet the maximum leakage requirements of ANSI Leakage Class V at higher operating temperatures.

In a valve employing a balanced valve plug arrangement, the valve plug most often moves in a direction perpendicular to the fluid flow. However, one of ordinary skill in the art will appreciate that other valve configurations, including angle valves, can have similar characteristics to those described herein. The chambers within the valve body are arranged such that there is fluid on both ends of the valve plug. This results in a first fluid pressure acting against valve plug movement at one end, and a second fluid pressure acting with valve plug movement at the other end. Therefore, fluid pressure forces tend to oppose one another, ensuring that resistance to opening and closing the valve is negligible. The forces on either side of the valve plug are greatly influenced by the port areas against which the internal fluid pressures in the valve act. Thus, when the net forces (the result of the first fluid force subtracted from the second fluid force) acting on the ends of the valve plug are minimized, the size of the actuator is minimized, resulting in a more cost effective valve solution.

FIG. 2 is a cross-sectional illustration of a double seat valve 20 with a balanced valve plug designed to meet the leakage requirements of ANSI Leakage Class V. The valve 20 has a valve plug 21 positioned by a valve stem 22. The valve stem 22 is in turn coupled to an actuator (not shown). The valve stem 22 protrudes from the valve 20 through a bonnet 23. The bonnet 23 includes a valve packing 24 that provides a fluid seal and serves to guide the valve stem 22 within the valve 20. As depicted, the valve plug 21 has a two-part construction, which includes a pilot plug 25 and a primary plug 26. The primary plug 26 cooperates with openings 27 formed in a cage 28 and with a lower seat ring 31 to control the flow of fluid between an inlet port 29 and an outlet port 30. The cage 28 forms part of a valve trim assembly that surrounds the valve plug 21 and helps characterize the flow of fluid passing through the valve. The valve trim typically modulates the fluid flow. The primary plug 26 is lifted away from the seat ring 31 by a washer 32 attached to the end of the pilot plug 25 by a nut 33. The primary plug 26 is biased toward the seat ring 31 by a plurality of springs, such as springs 37 and 38, forming a fluid seal.

The pilot plug 25 includes openings 35 and 36, which allow the fluid pressures above and below the pilot plug 25 to equalize. Thus, when the valve 20 is to be opened, the forces acting on the pilot plug 25 caused by fluid pressure on either side of the pilot plug 25 are relatively balanced. The valve stem 22 lifts the pilot plug 25 away from an upper valve seat 34, which is formed in the primary plug 26. This allows the pressure on both sides of the primary plug 26 to equalize through openings 39 formed in the primary plug 26.

When the valve 20 is to be closed, the actuator drives the valve stem 22, which in turn drives the primary plug 26 against the seat ring 31 to form a fluid seal. The springs 37 and 38 exert a force between the pilot plug 25 and the primary valve plug 26 to keep the port between the pilot plug 25 and the upper valve seat 34 open. This maintains the pressures across the primary plug 26 in a relatively balanced state until the primary plug 26 is seated against the lower valve seat 31. When the primary plug 26 is seated against the lower valve seat 31, the valve stem 22 causes the pilot plug 25 to seat against the upper valve seat 34, completing closure of the valve 20. This double seat arrangement allows the valve 20 to achieve Class V shut off.

Drawbacks of this double seat valve construction are that it is relatively complicated, and requires expensive, precisely machined components to achieve this balanced design. In addition, pilot-plug valve designs can become unstable in certain operating conditions.

SUMMARY OF THE INVENTION

There is a need in the art for a valve having a valve trim arrangement that, requires less stringent part tolerances, meets the leakage requirements of ANSI Leakage Class V, and which requires a reduced actuator force to open and close the valve, enabling the use of smaller actuators. The present invention is directed toward further solutions to address this need.

In general, valve trim can be identified as the internal components of a valve that are responsible for modulating the flow of the controlled fluid passing through the valve. The valve trim often includes such components as a seat ring, valve cage, valve stem, and other components along the valve walls that make contact with the fluid flow.

In accordance with one example embodiment of the present invention, a valve has a valve body with an inlet port and an outlet port. A valve stem extends through the valve body and has a center axis along which the valve stem travels. A multi-contoured valve cage is disposed within the valve body. The multi-contour of the valve cage is formed by a first perimeter surface, a first transition surface to a second perimeter surface substantially parallel to the center axis of the valve stem, and a second transition surface to a third perimeter surface. A valve plug is disposed at one end of the valve stem. The valve plug is movable relative to a first valve seat at a seat ring within the valve body. The valve plug controls the fluid flow through the inlet port and the outlet port of the valve. The valve plug includes openings for equalizing pressure across the valve plug. An annular channel is formed within a wall of the valve plug. A sealing ring is further disposed within the annular channel. The sealing ring is suitable for providing a seal to substantially hinder fluid leakage through the valve. The sealing ring is positioned to seal against the second perimeter surface to form a second valve seat.

In accordance with one illustrative embodiment, the sealing ring is in the form of a C-ring having an opening. The C-ring can be positioned within the annular channel, such that fluid leaking around the valve plug fills the opening and increases the sealing pressure applied by the C-ring.

In accordance with another embodiment of the present invention, the sealing ring is formed of a material enabling the valve to be operated at temperatures of above about 450° F.

In accordance a further embodiment of the present invention, a piston ring is provided forming a seal with the first perimeter surface.

In accordance with still another embodiment of the present invention, the sealing ring can slide along the second perimeter surface, while the valve plug moves toward a shut off position against the seat ring.

In accordance with still another embodiment of the present invention, the first perimeter surface is greater than the second perimeter, and the second perimeter surface is greater than the third perimeter surface.

In accordance with another illustrative embodiment of the present invention, a sealing system is provided having a multi-contoured valve cage. The multi-contoured valve cage has a first perimeter surface, a second perimeter surface, and a third perimeter surface. A valve plug has an annular channel. The valve plug is movable between an open position and a closed position. A sealing means is disposed within the annular channel. The sealing means is sized and dimensioned to form a seal with the second perimeter surface of the valve cage when the valve plug is in approximately a closed position.

In accordance with still another illustrative embodiment of the present invention, a sealing system is provided. The system includes a multi-contoured valve cage having a plurality of perimeter surfaces. A valve plug has an annular channel, and is movable between an open position and a closed position. A sealing means is disposed within the annular channel. The sealing means is sized and dimensioned to form a seal with one of the plurality of perimeter surfaces of the valve cage when the valve plug is in approximately a closed position. According to one aspect of the present invention, the sealing means does not intersect other of the plurality of perimeter surfaces of the valve cage.

BRIEF DESCRIPTION OF THE DRAWINGS

The aforementioned features, advantages, and aspects of the present invention, will be apparent from the following description and accompanying drawings, wherein.

DETAILED DESCRIPTION

Figure 1:
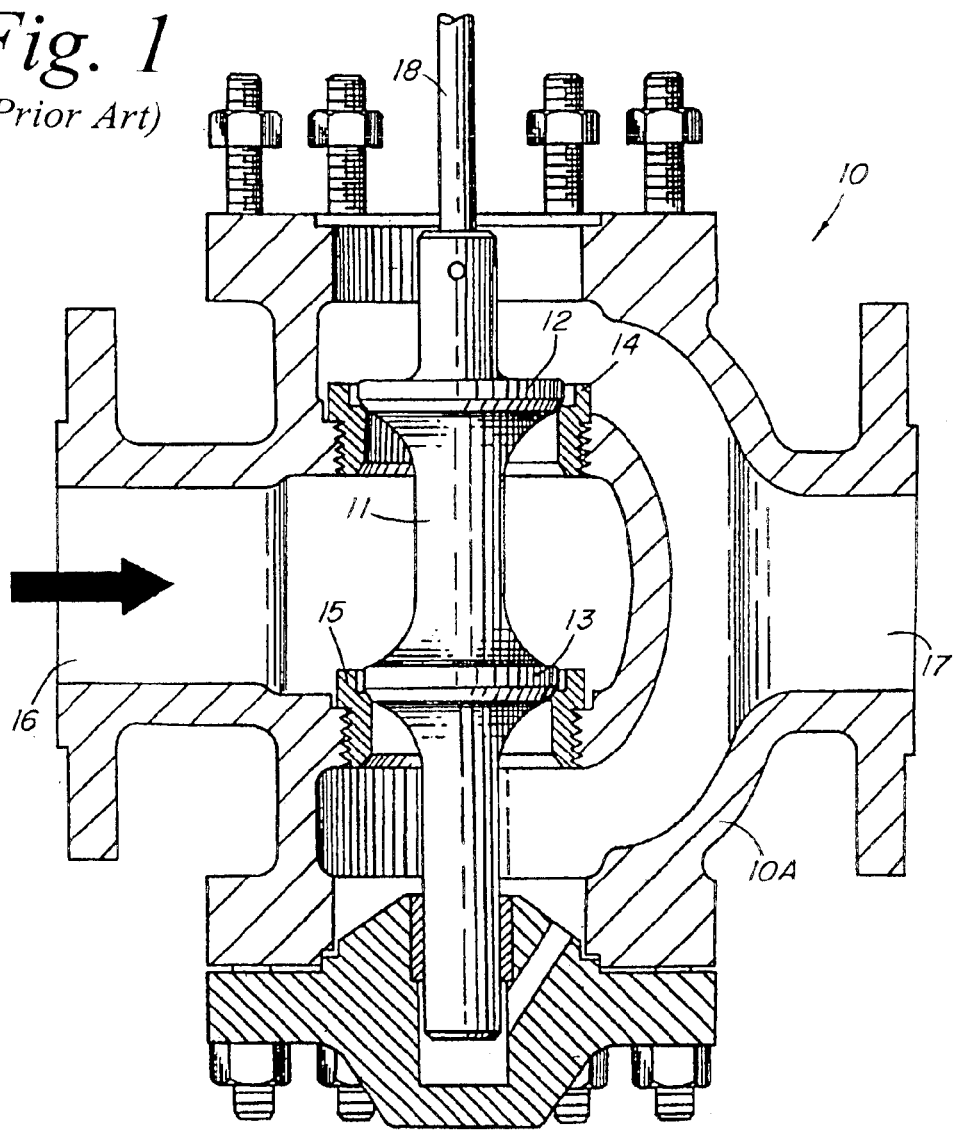
FIG. 1 is a cross-sectional schematic illustration of a conventional double port valve.
Figure 2:
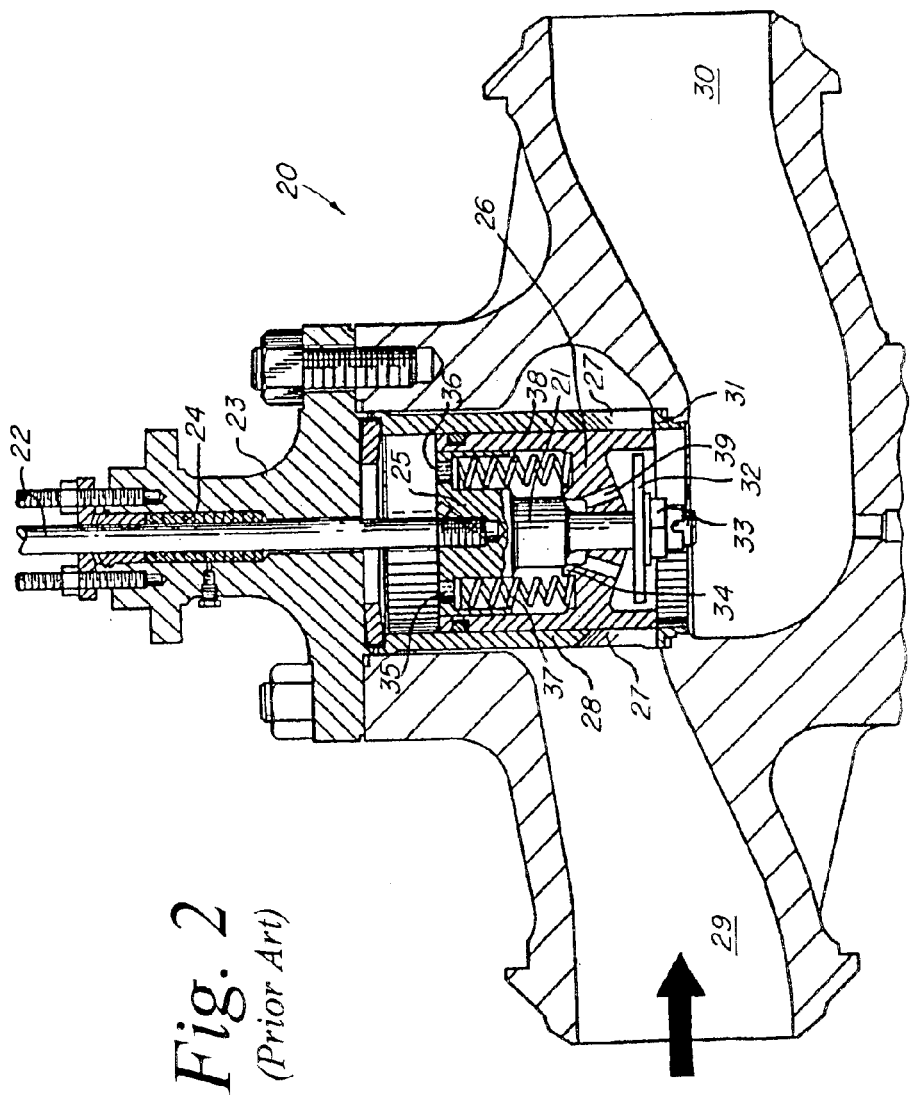
FIG. 2 is a cross-sectional schematic illustration of conventional double seat valve.

An illustrative embodiment of the present invention relates to a valve trim arrangement for a valve that achieves a more consistent and reliable fluid shut off, while concomitantly providing a valve that satisfies the requirements of ANSI Leakage Class V. The valve trim arrangement of the present invention modulates the flow of a fluid, and includes a valve cage having an inner perimeter surface substantially parallel with a valve stem of the valve. A valve plug is coupled to one end of the valve stem, the other end of which is coupled to an actuator. A sealing ring disposed within an annular channel formed in the valve plug can travel a selected distance along the perimeter surface of the valve cage. This enables the valve plug to engage a seat ring across a broader range of possible positions while concomitantly providing a primary seat at the seat ring and a secondary seat at the sealing ring.

The sealing ring can be in the form of a C-ring. An open portion of the C-ring faces an oncoming fluid flowing through the valve. Thus, any fluid leaking past the valve plug collects within the C-ring and provides additional pressure that pushes the C-ring against the valve cage to strengthen and improve the seal, thus helping to inhibit unwanted fluid flow. In addition, a second perimeter surface of the valve cage is substantially parallel to a direction of travel of the valve plug. This enables the sealing ring to travel along the valve cage with the application of a relatively small actuating force. The smaller actuating force can provide the opportunity for reducing the size of the actuator used to move the valve plug to open and close the valve.

FIGS. 3, 3A, 3B, and 4 wherein like parts are designated by like reference numerals throughout, illustrate an example embodiment of a valve trim according to the present invention. Although the present invention will be described with reference to the example embodiment illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 3:
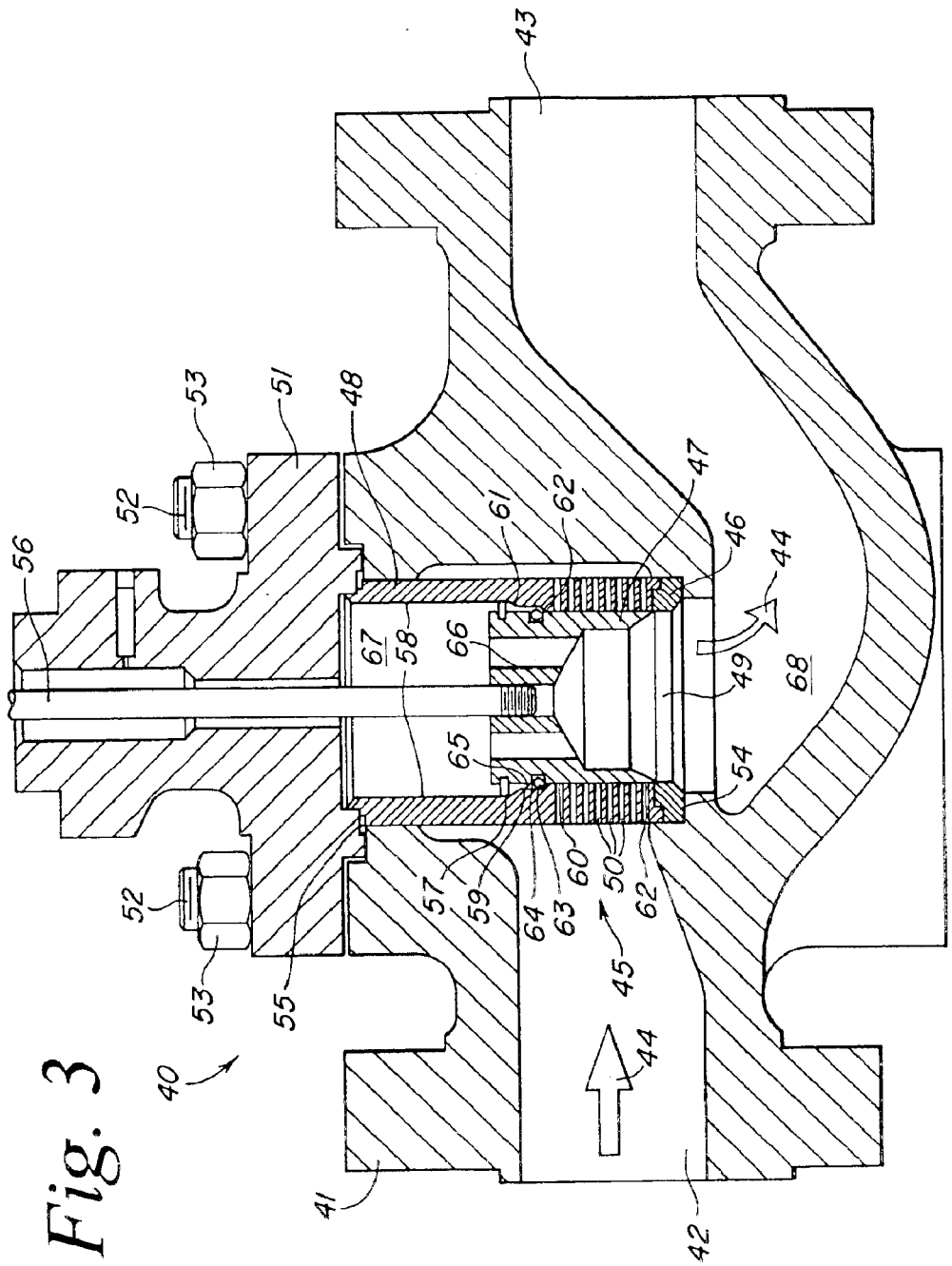
FIG. 3 is a cross-sectional schematic illustration of a valve and trim arrangement in accordance with one aspect of the present invention.

FIG. 3 is a cross-sectional view of a valve 40 constructed in accordance with the teachings of the present invention. The valve 40 includes a valve body 41 having a first port 42 and a second port 43, either of which may be designated as an inlet port, and the other of which may be designated as an outlet port. The designation of inlet versus outlet depends upon the direction of fluid flowing through the valve. For the flow direction shown by arrows 44, the first port 42 is the inlet port and the second port 43 is the outlet port.

A trim arrangement 45 disposed within a chamber formed in the valve body 41 controls the flow of fluid between the first port 42 and the second port 43. The trim arrangement 45 includes a valve plug 47, a valve cage 48, and a lower valve seat in the form of a seat ring 46. The seat ring 46 has an opening 49 and the valve cage 48 has a plurality of openings 50 through which fluid can flow when the valve 40 is disposed in an open position.

A bonnet 51 is coupled with the valve body 41 by fasteners, such as bolts 52 and nuts 53. A first gasket 54 is disposed between the valve body 41 and the seat ring 46. A second gasket 55 is disposed between the bonnet 51 and both the valve cage 48 and the valve body 41. The gaskets 54 and 55 help to prevent unwanted fluid leakage from the valve body 41. When the bonnet 51 is attached to the valve body 41, the bonnet 51 compresses the second gasket 55 between the bonnet 51 and both the valve body 41 and the valve cage 48. In addition, the bonnet 51 compresses the first gasket 54 between the seat ring 46 and the valve body 41. The compression of the first gasket 54 and the second gasket 55 serves to contain fluid flowing within the valve body 41. The bonnet 51 further compresses the valve cage 48 against the seat ring 46 to retain the seat ring 46 within the valve body 41. One of ordinary skill in the art will appreciate that other arrangements are possible, including additional elements such as load rings, when building control valves. As such, the present invention is not limited to the specific example configuration illustrated in the figures, but can include known variations.

A valve stem 56 extends through the bonnet 51 into the valve body 41. Conventional valve packing and seals (not shown) may be provided around the valve stem 56 to enable the valve stem 56 to reciprocate within the valve body 41 with little to no leakage. The valve stem 56 couples to the valve plug 47 at one end and to the actuator (not shown) at the other. The actuator reciprocatingly moves the valve stem 56 within the valve body 41, thereby moving the valve plug 47 between open and closed positions.

The valve plug 47 cooperates with the seat ring 46 to control the flow of fluid through the valve 40. When the valve plug 47 is in a closed or shut off position, the valve plug 47 seats against, the seat ring 46. The valve plug 47 approximately covers the openings 50 of the valve cage 48, and engages a sealing ring 63 to help shut off fluid flowing from the first port 42 to the second port 43. When the valve plug 47 is disposed in an open position, the valve plug 47 disengages from the seat ring 46. In the valve open position, fluid can flow from the first port 42, through the openings 50 in the valve cage 48, and the opening 49 in the seat ring 46, into the second port 43. In addition, the valve plug 47 can include a conventional piston ring 57 to minimize leakage between the valve cage 48 and the valve plug 47, while the valve plug is throttling flow through the valve 40.

Figure 3A:
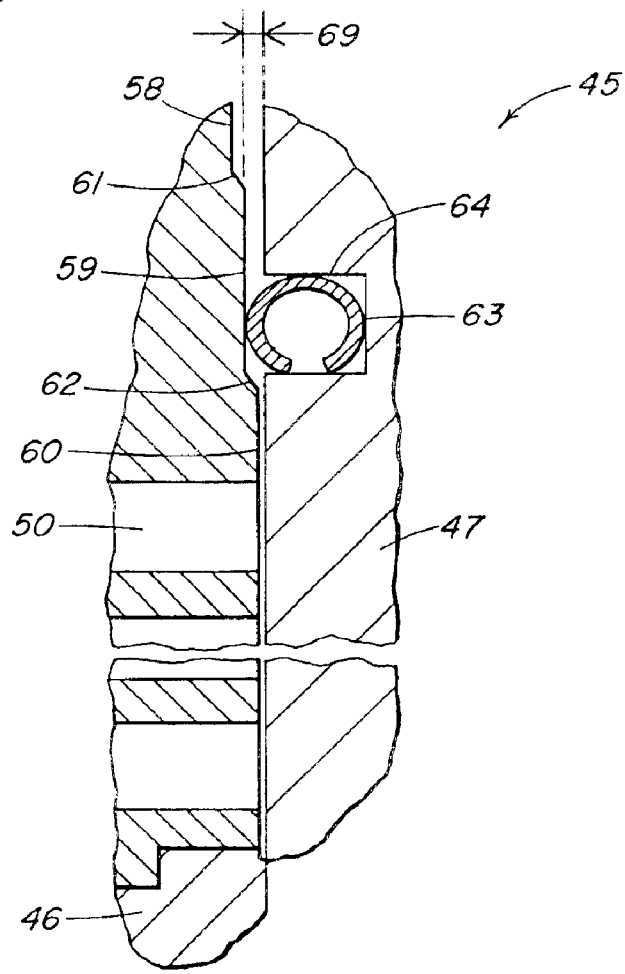
FIG. 3A is an enlarged cross-sectional illustration of a portion of the trim arrangement shown in FIG. 3.

As shown in FIGS. 3 and 3A, the valve cage 48 has a multi-contoured inner perimeter surface. For example, the multi-contoured inner perimeter surface includes a first cage perimeter surface 58, a second cage perimeter surface 59, and a third cage perimeter surface 60. The radius of first cage perimeter surface 58 is greater than the radius of the second cage perimeter surface 59. Likewise, the second cage perimeter surface 59 is greater than the radius of the third cage perimeter surface 60. The multi-contoured surface further includes a first transition surface 61 that provides a relatively gradual transition from the first cage perimeter surface 58 to the second cage perimeter surface 59. A second transition surface 62, also part of the multi-contoured surface, provides a relatively gradual transition from the second cage perimeter 59 to the third cage perimeter surface 60. The first transition surface 61 couples the first cage perimeter surface 58 with the second cage perimeter surface 59 without employing a sharp, acute, or jagged type edge that would otherwise interfere with or impede the ability of the sealing ring 63 as it slides from the first cage perimeter surface 58 to the second cage perimeter surface 59. Therefore, the first transition surface 61 need not be completely smooth, but rather, need only be sufficiently gradual as to avoid unwanted interference with the movement of the sealing ring 63 along the multi-contoured surface. The first transition surface 61 can also act as a guide to direct the sealing ring 63 into a relatively more compressed state when adjacent one of the cage perimeter surfaces, such as the second cage perimeter surface 59.

According to one aspect of the present invention, the radius of the first cage perimeter surface 58 is selected so that the sealing ring 63 can pass by the first cage perimeter surface 58 without making any contact, or with making only minimal or slight contact therewith. The sealing ring 63, therefore, does not create any additional substantive friction with the first cage perimeter surface 58 to act against an actuator force moving the valve plug 47 within the valve. More significantly, the sealing ring 63, does not make additional contact away from the multi-contoured inner perimeter surfaces, thus reducing wear on the sealing ring 63. However, as the valve plug 47 continues moving downwardly into a closed position the sealing ring 63 engages or contacts the first transition surface 61. As the valve plug 47 continues moving downward, as illustrated of FIG. 3, the sealing ring 63 slides over the first transition surface 61 and then engages the second cage perimeter surface 59. The radius of the second cage perimeter surface 59 is selected to compress the sealing ring 63 between the perimeter surface 59 and an annular channel or conduit 64 formed in the valve plug 47, and which accommodates the sealing ring 63.

The second cage perimeter surface 59 is substantially parallel to the direction of movement of the valve stem 56, and hence the valve plug 47. In addition, the second cage perimeter surface 59 provides an extended region of contact, along which the sealing ring 63 can slide until the valve plug 47 makes contact with the seat ring 46 to dispose the valve in a closed or shut off position.

The sealing ring 63 is disposed within the annular conduit 64 formed in the valve plug 47. The walls of the annular conduit 64, therefore, hold the sealing ring 63 in place as the valve plug 47 slides into the closed position. When in position, the sealing ring 63 makes contact with the second cage perimeter surface 59, and at least two of the three walls of the annular conduit 64 (the open side of the C-shaped sealing ring 63 may not always maintain contact with the annular conduit 64 with a fluid force acting upon the sealing ring 63). The extended portion of the second cage perimeter surface 59 enables the sealing ring 63 to slide and not constrain movement of the valve plug 47, thus enabling the valve plug 47 to contact the seat ring 46 along a range of possible shut off locations. More specifically, the sealing ring 63 initially contacts the second cage perimeter surface 59 as the valve plug moves toward the seat ring 46. The extended surface of the second cage perimeter surface 59 enables the sealing ring 63 to slide along the second cage perimeter surface 59 until the valve plug 47 makes sealing contact with the seat ring 46. The ability of the sealing ring 63 to slide along a range of valve plug 47 positions in a manner that still maintains a seal, enables a relatively relaxed tolerance in machining and assembly of valve components. Furthermore, the arrangement results in a valve 40 that can meet the required sealing characteristics of an ANSI Leakage Class V shut off valve. Again, the sealing ring 63 is compressed only when the valve plug 47 is approaching or is disposed in the closed position (i.e., when it is adjacent the second cage perimeter 59). Consequently, wear on the sealing ring 63 is minimized.

The sealing ring 63 can take a number of forms. The form shown in the illustrative embodiment is a C-ring seal. However, one of ordinary skill in the art will appreciate that other sealing ring shapes and types may be utilized in conjunction with the teachings of the present invention. The orientation of the C-ring shaped sealing ring 63 shown in FIG. 3 accommodates flow through the valve 40 from the first port 42 to the second port 43. The sealing ring 63 provides a substantially fluid type seal between the valve plug 47 and the valve cage 48 when the valve plug 47 is positioned against the seat ring 46. More specifically, when the valve 40 is closed, positioning the valve plug 47 against the seat ring 46, the sealing ring 63 provides a seal against leakage through the valve 40 between the valve plug 47 and the valve cage 48. Fluid attempting to leak through the valve 40 between the valve plug 47 and the valve cage 48 enters the opening of the sealing ring 63 and presses the sealing ring 63 more tightly against the second cage perimeter surface 59 and the annular conduit 64. This action increases the seal between the valve plug 47 and the valve cage 48. The mechanical spring force of the sealing ring 63 also compensates for errors within the machining tolerances and dimensional variations caused by temperature changes. This mechanical spring force can be replicated in an opposite flow direction if the sealing ring 63 is flipped upside-down from the position shown in the figures. Thus, the present invention is not limited to flow only in the direction show, but rather, one of ordinary skill in the art will appreciate that different flow directions can be accommodated by altering the direction of the opening in the C-shaped sealing ring 63.

Figure 3B:
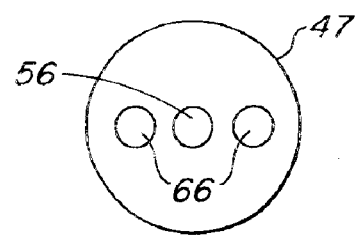
FIG. 3B is a top view of the valve plug shown in FIGS. 3 and 3A.

As shown in FIGS. 3 and 3B, the valve plug 47 has conduits 66 formed therein to balance the pressures acting across the valve plug 47. More specifically, because of the conduits 66, the pressures in a first volume 67 above the valve plug 47 and a second volume 68 below the valve plug 47 are substantially equalized (only the stem area provides a surface for fluid pressure to act upon). This results in the application of generally equal but opposite internal fluid forces to the valve plug 47, except for an unbalanced annular region 69 of the valve plug 47. This unbalanced annular region 69 is shown in FIG. 3A.

As shown in FIG. 3A, the trim arrangement includes the valve cage 48, the sealing ring 63, the annular conduit 64, the valve plug 47, and the seat ring 46. As illustrated, the sealing ring 63 presses against the annular conduit 64 and the second cage perimeter 59 when the valve 40 is disposed in the closed position, and the lower portion of the valve plug 47 seats against the seat ring 46. However, because of the conduits 66 (FIG. 3) that pass through the valve plug 47, outlet pressure is applied against both the upper and lower sides of the valve plug 47. These upper and lower sides have generally equal areas except for the area of the valve stem, which can be minimized. Since the pressures in the first volume 67 and the second volume 68 are equal and act against generally equal areas, these pressures exert generally equal but opposite forces on the valve plug 47. These generally equal but opposite forces offset one another. However, there is an area of the valve plug 47 exposed to different pressures. The different pressures result in the application of non-offsetting forces to the valve plug 47. Hence, this area forms the unbalanced annular region 69, as shown in FIG. 3A.

The unbalanced annular region 69 has an outer radius defined by the point at which the sealing ring 63 makes contact with the second cage perimeter surface 59, and an inner radius defined by the point at which the lower portion of the valve plug 47 contacts the seat ring 46. The lower side of this unbalanced annular region 69 is exposed to inlet pressure because of leakage between the valve plug 47 and the valve cage 48, which will fill the sealing ring 63. The upper side of this unbalanced annular region 69, at the top of the valve plug 47, is exposed to the outlet pressure in the first volume 67. When these pressures are different, a resulting net force is applied to the valve plug 47, which must be overcome by the valve actuator to close the valve. The net force is proportional to the difference between these pressures multiplied by the unbalanced annular region 69. Because the size of the unbalanced annular region 69 is relatively small, the net force acting on the valve plug 47 due to this unbalanced annular region 69 is also relatively small. In addition, opportunity is created for use of a smaller actuator to close the valve plug 47 against the seat ring 46, relative to conventional valves.

The illustrated trim arrangement 45 of the present invention also meets ANSI Leakage Class V shut off requirements when the valve plug 47 is positioned against the seat ring 46 (e.g., is disposed in the closed position). The sealing ring 63 can be made of a suitable material, such as Inconel X750 (Industry Designation N07750), or 718 metal (Industry Designation N07718), such that the valve 40 can withstand relatively high temperatures (e.g., approximately 450° F. and above).

Figure 4:
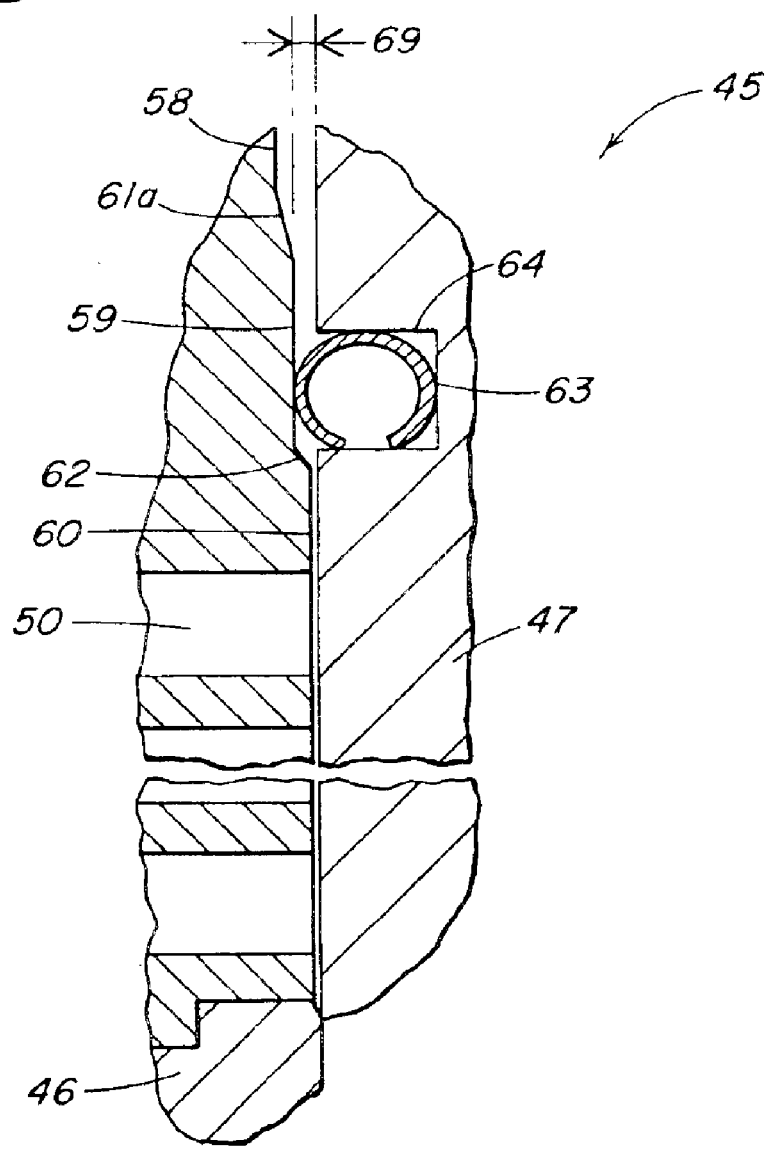
FIG. 4 is an englarged cross-sectional illustration of a portion of the trim arrangement according to one example embodiment.

FIG. 4 illustrates one example embodiment of the trim arrangement 45 of the present invention that was constructed. The example embodiment included the first cage perimeter surface 58, the second cage perimeter surface 59, and the third cage perimeter surface 60. The radius of first cage perimeter surface 58 was greater than the radius of the second cage perimeter surface 59. Likewise, the second cage perimeter surface 59 was greater than the radius of the third cage perimeter surface 60. The multi-contoured surface further included a first transition surface 61 a that provides a relatively gradual transition from the first cage perimeter surface 58 to the second cage perimeter surface 59. More specifically, the example embodiment utilized an angle of about 7.5 degrees as the lead in angle to the second cage perimeter 59, measured from a vertical valve centerline. In addition, a radius placed on the intersection between the first transition surface 61a and the second cage perimeter 59 was about 0.25 inches. The second transition surface 62, also part of the multi-contoured surface, additionally provided a transition from the second cage perimeter 59 to the third cage perimeter surface 60. It should be noted that the angle and radius measurements are representative of one example embodiment of the present invention. Applicants intend the scope of the present invention to extend beyond these specific measurements as understood by one of ordinary skill in the art.

The first transition surface 61a coupled the first cage perimeter surface 58 with the second cage perimeter surface 59 without employing a sharp, acute, or jagged type edge. Such an edge would otherwise interfere with or impede the ability of the sealing ring 63 as it slides from the first cage perimeter surface 58 to the second cage perimeter surface 59. The gradual angle of about 7.5 degrees also acts as a guide to direct the sealing ring 63 into a relatively more compressed state when adjacent the second cage perimeter surface 59.

Returning to the invention in general, the illustrated trim arrangement 45 advantageously provides a more consistent fluid shut off, with relatively smaller actuator forces required to close the valve 40. The sealing ring 63 disposed within the annular channel 64of the valve plug 47 can be made of a high temperature resistant material, such as metal, to create a high temperature Leakage Class V shut off. The sealing ring 63 can further be in the form of a C-ring. An open portion of the C-ring can face an oncoming fluid flow through the valve. Thus, any fluid leaking past the valve plug collects within the C-ring and provides additional pressure pushing the C-ring against the valve cage to strengthen and improve the seal. In addition, the second perimeter of the valve cage is substantially parallel with a direction of travel of the valve plug. This results in the sealing ring being able to travel along the valve cage with the application of a relatively small actuating force. This creates an opportunity for substitution of a relatively smaller actuator to move of the valve plug within the valve to open and close the valve. In addition, the valve plug can seat with the seat ring over a broad range of plug travel distances, and the sealing ring can still maintain a proper seal with the second cage perimeter of the valve cage.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A valve, comprising:

a valve body having an inlet port and an outlet port;

a valve seat disposed within the valve body defining an opening fluidly communicating between the inlet port and the outlet port;

a valve stem extending through the valve body and movable therethrough along an axis;

a valve plug coupled to one end of the valve stem, the valve plug having a closed position, in which the valve plug engages the valve seat to form a primary seal, wherein the valve plug is movable away from the closed position to control a fluid flow through the valve seat opening, the valve plug including a conduit adapted to equalize pressure across the valve plug and an annular channel;

a sealing ring disposed within the annular channel of the valve plug; and a valve cage disposed within the valve body and having an internal surface sized to receive the valve plug, wherein a gap between the valve cage and the valve plug defines a secondary leak path, the valve cage internal surface including a multi-contoured inner perimeter surface having at least a first perimeter surface and a second perimeter surface, with a first transition surface disposed between the first perimeter surface and second perimeter surface, the second perimeter surface being formed as a generally cylindrical wall substantially concentric with the valve stem axis and being sufficiently proximate the valve plug to sealingly engage the sealing ring, thereby to form a secondary seal restricting fluid leakage through the secondary leak path, and the first perimeter surface being disposed farther away from the valve plug than the second perimeter surface.

2. The valve of claim in which the multi-contoured inner perimeter surface of the valve cage further includes a third perimeter surface and a second transition surface disposed between the second perimeter surface and the third perimeter surface, wherein the third perimeter surface is substantially concentric with the valve stem axis and is disposed closer to the valve plug.

3. The valve of claim 1, in which the first perimeter surface is substantially concentric with the valve stem axis.

4. The valve of claim 1, in which the sealing ring comprises a C-ring having an opening.

5. The valve of claim 4, in which the C-ring is oriented so that the opening receives fluid flowing through the secondary leak path, so that the fluid fills the opening and pushes the C-ring against the second perimeter surface, thereby to improve the secondary seal.

6. The valve of claim 1, in which the sealing ring comprises a material suitable for operation at temperatures of at least about 450° F.

7. The valve of claim 6, in which the material comprises a metal.

8. The valve of claim 1, further comprising a piston ring disposed between the valve cage and the valve plug for forming a fluid seal with the valve cage.

9. The valve of claim 1, in which the sealing ring is adapted to slide along the second perimeter surface during use.

10. The valve of claim 1, in which the first transition surface has a generally frustoconical shape formed at an angle of about 7.5 degrees with respect to the valve stem axis.

11. A valve, comprising:
a valve body having an inlet port and an outlet port;
a valve seat disposed within the valve body defining an opening fluidly communicating between the inlet port and the outlet port;
a valve stem extending through the valve body and movable therethrough along an axis;
a valve plug coupled to one end of the valve stem, the valve plug having a closed position, in which the valve plug engages the valve seat to form a primary seal, wherein the valve plug is movable away from the closed position to control a fluid flow through the valve seat opening, the valve plug including a conduit adapted to equalize pressure across the valve plug; and
a valve cage disposed within the valve body and having an internal surface sized to receive the valve plug, wherein a gap between the valve cage and the valve plug defines a secondary leak path;
wherein one of the valve cage and valve plug is a secondary seal bearing component that includes a channel sized to receive a sealing ring; and
wherein the other of the valve cage and valve plug is a secondary seal mating component that includes a multi-contoured inner perimeter surface, the multi-contoured inner perimeter surface having at least a first perimeter surface and a second perimeter surface, with a first transition surface disposed between the first perimeter surface and second perimeter surface, the second perimeter surface being formed as a generally cylindrical wall substantially concentric with the valve stem axis and being sufficiently proximate the seal bearing component to sealingly engage the sealing ring, thereby to form a secondary seal restricting fluid leakage through the secondary leak path, and the first perimeter surface being disposed farther away from the seal bearing component than the second perimeter surface.

12. The valve of claim 11, in which the secondary seal bearing component comprises the plug and the secondary seal mating component comprises the cage.

13. The valve of claim 11, in which the multi-contoured inner perimeter surface of the valve cage further includes a third perimeter surface and a second transition surface disposed between the second perimeter surface and the third perimeter surface, wherein the third perimeter surface is substantially concentric with the valve stem axis and is disposed closer to the valve plug.

14. The valve of claim 11, in which the first perimeter surface is substantially concentric with the valve stem axis.

15. The valve of claim 11, in which the sealing ring comprises a C-ring having an opening.

16. The valve of claim 11, in which the C-ring is oriented so that the opening receives fluid flowing through the secondary leak path, so that the fluid fills the opening and pushes the C-ring against the second perimeter surface, thereby to improve the secondary seal.

17. The valve of claim 11, in which the sealing ring comprises a material suitable for operation at temperatures of at least about 450° F.

18. The valve of claim 17, in which the material comprises a metal.

19. The valve of claim 11, further comprising a piston ring disposed between the valve cage and the valve plug for forming a fluid seal with the valve cage.

20. The valve of claim 11, in which the sealing ring is adapted to slide along the second perimeter surface during use.

21. The valve of claim 11, in which the first transition has a generally frustoconical shape formed at an angle of about 7.5 degrees with respect to the valve stem axis.

22. A high temperature valve comprising:
a valve body having an inlet port and an outlet port;
a valve seat disposed within the valve body defining an opening fluidly communicating between the inlet port and the outlet port;
a valve stem extending through the valve body and movable therethrough along an axis;
a valve plug coupled to one end of the valve stem, the valve plug having a closed position, in which the valve plug engages the valve seat to form a primary seal, wherein the valve plug is movable away from the closed position to control a fluid flow through the valve seat opening, the valve plug including a conduit adapted to equalize pressure across the valve plug and an annular channel;
a sealing ring disposed within the annular channel of the valve plug; and
a valve cage disposed within the valve body and having an internal surface sized to receive the valve plug, in which the valve cage internal surface includes a multi-contoured inner perimeter surface having at least a first perimeter surface and a second perimeter surface, wherein the second perimeter surface sealingly engage the sealing ring over a range of sealing positions and the first perimeter surface is disposed farther away from the valve plug than the second perimeter surface wherein a gap between the valve cage and the valve plug defines a secondary leak path, the valve cage internal surface sealingly engaging the sealing ring to form a secondary seal restricting fluid leakage through the secondary leak path over a range of plug positions, thereby to accommodate differences in thermal expansion between the valve plug and valve cage.

23. The valve of claim 22, in which the sealing ring comprises a material suitable for operation at temperatures of at least about 450° F.

24. The valve of claim 22, in which the valve cage internal surface includes a multi-contoured inner perimeter surface having at least a first perimeter surface and a second perimeter surface, wherein the second perimeter surface sealingly engages the sealing ring over a range of plug positions and the first perimeter surface is disposed farther away from the valve plug than the second perimeter surface.

25. The valve of claim 24, in which the second perimeter surface is formed as a generally cylindrical wall substantially concentric with the valve stem axis.

26. The valve of claim 22, further comprising a first transition surface disposed between the first perimeter surface and second perimeter surface.

27. The valve of claim 22, in which the sealing ring comprises a C-ring having an opening.

28. The valve of claim 27, in which the C-ring is oriented so that the opening receives fluid flowing through the secondary leak path, so that the fluid fills the opening and pushes the C-ring against the second perimeter surface, thereby to improve the secondary seal.

29. The valve of claim 22, which the sealing ring is adapted to slide along the second perimeter surface during use.

30. The valve of claim 22, in which the first transition surface has a generally frustoconical shape fanned at an angle of about 7.5 degrees with respect to the valve stem axis.

31. The valve of claim 22, in which the secondary seal allows a maximum fluid leakage substantially meeting ANSI Class V standards.

* * * * *

UNITED STATES PATENT AND TRADEMARK OFFICE
CERTIFICATE OF CORRECTION

PATENT NO. : 6,851,658 B2
DATED : February 8, 2005
INVENTOR(S) : William V. Fitzgerald et al.

It is certified that error appears in the above-identified patent and that said Letters Patent is hereby corrected as shown below:

Column 1,
Line 61, please delete "value plug" and insert -- valve plug --.

Column 4,
Line 27, please delete "accordance a further" and insert -- accordance with a further --.

Column 5,
Line 11, please delete "englarged" and insert -- enlarged --.

Column 6,
Line 40, please delete "against," and insert -- against --.

Column 8,
Line 31, please delete "show" and insert -- shown --.

Column 9,
Lines 38 and 45, please delete "61 a" and insert -- 61$a$ --.

Column 11,
Line 1, please delete "claim" and insert -- claim 1 --.

Column 14,
Line 6, please delete "which" and insert -- in which --.
Line 10, please delete "fanned" and insert -- formed --.

Signed and Sealed this

Twenty-fourth Day of May, 2005

JON W. DUDAS
*Director of the United States Patent and Trademark Office*